(12) United States Patent
Sugizaki et al.

(10) Patent No.: US 7,046,885 B2
(45) Date of Patent: May 16, 2006

(54) OPTICAL FIBER, RAMAN AMPLIFIER, AND OPTICAL COMMUNICATION SYSTEM

(75) Inventors: Ryuichi Sugizaki, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 288 days.

(21) Appl. No.: 10/674,343

(22) Filed: Oct. 1, 2003

(65) Prior Publication Data
US 2004/0114896 A1    Jun. 17, 2004

(30) Foreign Application Priority Data
Oct. 1, 2002    (JP)    ............... 2002-288960

(51) Int. Cl.
*G02B 6/16*    (2006.01)

(52) U.S. Cl. ...................... 385/123; 385/126

(58) Field of Classification Search ...................... None
See application file for complete search history.

(56) References Cited

U.S. PATENT DOCUMENTS 6,862,391 B1 *   3/2005   Hirano et al. ............... 385/123
2004/0028359 A1 * 2/2004   Tirloni et al. ............... 385/123

* cited by examiner

*Primary Examiner*—Juliana Kang
(74) *Attorney, Agent, or Firm*—Oblon, Spivak, McClelland, Maier & Neustadt, P.C.

(57) ABSTRACT

An optical fiber, which is employed as a transmission line of an optical communication system, has a cable-cutoff wavelength of not longer than 1430 nanometers at the wavelength of 1450 nanometers, a mode-field diameter of not less than 7 micrometers and not more than 9 micrometers, a transmission loss of not more than 0.285 dB/km, and a dispersion of 0.1 to 4 ps/nm/km.

9 Claims, 4 Drawing Sheets

FIG.4

CHARACTERISTICS OF PRODUCED FIBERS

| | Δ1 (%) | Δ2 (%) | Δ3 (%) | d1 (μm) | d2 (μm) | d3 (μm) | $\lambda_0$ (nm) | D (ps/nm/km) | LOSS (dB/km) | MFD (μm) | gR/Aeff (1/W/km) | LOSS$_{\phi20}$ (dB/m) | $\lambda_{cc}$ (nm) |
|---|---|---|---|---|---|---|---|---|---|---|---|---|---|
| 1 | 0.6 | -0.3 | 0.3 | 7.10 | 12.90 | 16.77 | 1415 | 1.23 | 0.245 | 7.09 | 0.79 | 3.4 | 1253 |
| 2 | 0.6 | -0.3 | 0.1 | 6.90 | 11.50 | 14.95 | 1406 | 1.93 | 0.254 | 7.01 | 0.81 | 2.4 | 863 |
| 3 | 0.6 | -0.3 | 0.2 | 7.32 | 12.20 | 18.30 | 1401 | 1.96 | 0.282 | 7.21 | 0.76 | 4.5 | 1372 |
| 4 | 0.55 | -0.5 | 0.2 | 7.77 | 11.10 | 16.65 | 1366 | 1.93 | 0.255 | 7.40 | 0.73 | 4.6 | 1188 |
| 5 | 0.5 | -0.5 | 0.4 | 8.26 | 12.70 | 16.51 | 1372 | 3.06 | 0.243 | 7.69 | 0.67 | 4.8 | 1397 |
| 6 | 0.55 | -0.5 | 0.3 | 7.67 | 11.80 | 15.34 | 1374 | 3.10 | 0.247 | 7.24 | 0.76 | 4.8 | 1290 |

DISPERSION D, TRANSMISSION LOSS LOSS, MODE-FIELD DIAMETER MFD, WAVELENGTH OF 1450 NANOMETERS FOR MEASURING gR/Aeff, WAVELENGTH OF 1550 NANOMETERS FOR MEASURING BENDING LOSS LOSS$_{\phi20}$

OPTICAL FIBER, RAMAN AMPLIFIER, AND OPTICAL COMMUNICATION SYSTEM

BACKGROUND OF THE INVENTION

1) Field of the Invention

The present invention relates to an optical fiber, a Raman amplifier using the optical fiber, and an optical communication system using the optical fiber.

2) Description of the Related Art

A Raman amplifier is characterized in that the optical signal transmission distance is extended and noise in optical fiber transmission is reduced. As the Raman amplifier, a distributed Raman amplifier and a discrete Raman amplifier are known.

The distributed Raman amplifier includes of first and second pump light sources, optical multiplexers and an optical fiber. This distributed Raman amplifier is also applied to the embodiment of the present invention.

Meanwhile, the discrete Raman amplifier is an optical amplifier constituted so that an amplified light is inputted to an optical fiber in an enclosed device, for example, accommodates the coiled optical fiber and is installed in a relay station, such as a dispersion compensating module. A dispersion compensating module is typical of the assembled optical fiber.

If the optical fiber is made of silica glass, a maximum gain peak of Raman amplification appears at an optical frequency lower by 13 terahertz (in other words, about 100 nanometers) than that of a pump light. In the optical communication system in a 1.5 micrometers band, for example, the pump light should be set to have a wavelength of 1480 nanometers so that a signal light at a wavelength of 1580 nanometers can attain a maximum Raman gain.

In a wavelength division multiplexing (hereinafter, "WDM") system, a pump light at a short wavelength amplifies a signal light at a short wavelength and the pump light at a long wavelength amplifies the signal light at a long wavelength.

In the optical communication system, if a zero-dispersion wavelength of the optical fiber is between the wavelength of the signal light and the wavelength of the pump light, four-wave mixing (hereinafter, "FWM") due to the signal light and the pump light, which is a nonlinear phenomenon, occurs nearly at the wavelength of the signal light and deteriorates transmission characteristics of the system.

Meanwhile, if the FWM generating efficiency increases, the pump light exploited by the FWM increases and thus the signal light cannot attain a high Raman gain.

Countermeasures against such a disadvantage using the optical fiber having a zero dispersion wavelength between the wavelengths of the signal light and the pump light is to lower the intensity of the pump light. However, this is not a good solution since it causes a decrease in Raman amplification gain.

If the zero-dispersion wavelength of the optical fiber is smaller than the wavelength of the pump light, the FWM due to the signal light and the pump light can be suppressed without decreasing the Raman amplification gain.

An Erbium-doped fiber amplifier (hereinafter, "EDFA") with an Erbium-doped optical fiber allows an optical signal transmission in C-band (e.g. the wavelength band of 1530 to 1565 nanometers) in a Dense Wavelength Division Multiplexing (hereinafter, "DWDM") system. Recently, optical transmission using the signals in L-band (e.g. the wavelength band of 1565 to 1625 nanometers) is actively introduced.

As explained, the Raman amplifier communication system requires the pump light with a wavelength shorter by about 100 nanometers than the minimum wavelength of the signal light. This indicates that the optical fiber for Raman amplification in both C-band and L-band should not have a zero-dispersion wavelength between 1430 nanometers, shorter by 100 nanometers than 1530 nanometers, and 1625 nanometers.

SUMMARY OF THE INVENTION

It is an object of the present invention to provide an optical fiber, a distributed Raman amplifier and an optical transmission line to realize an effective amplifier with lower pumping power.

An optical fiber according to one aspect of the present invention has a cable-cutoff wavelength of not longer than 1430 nanometers, a mode-field diameter of not less than 7 micrometers and not more than 9 micrometers at a wavelength of 1450 nanometers, a transmission loss of not more than 0.285 dB/km at the wavelength of 1450 nanometers, and a dispersion of not less than 0.1 ps/nm/km and not more than 4 ps/nm/km at the wavelength of 1450 nanometers.

A distributed Raman amplifier according to another aspect of the present invention includes the optical fiber as an amplifying medium.

An optical communication system according to still another aspect of the present invention includes the optical fiber serving as a transmission line and the distributed Raman amplifier.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a table of characteristics of six types of optical fibers that are produced each with varied relative refractive index differences Δ1 to Δ3 and varied diameters d1, d2 and d3 (micrometers);

DETAILED DESCRIPTION

Figure 1:
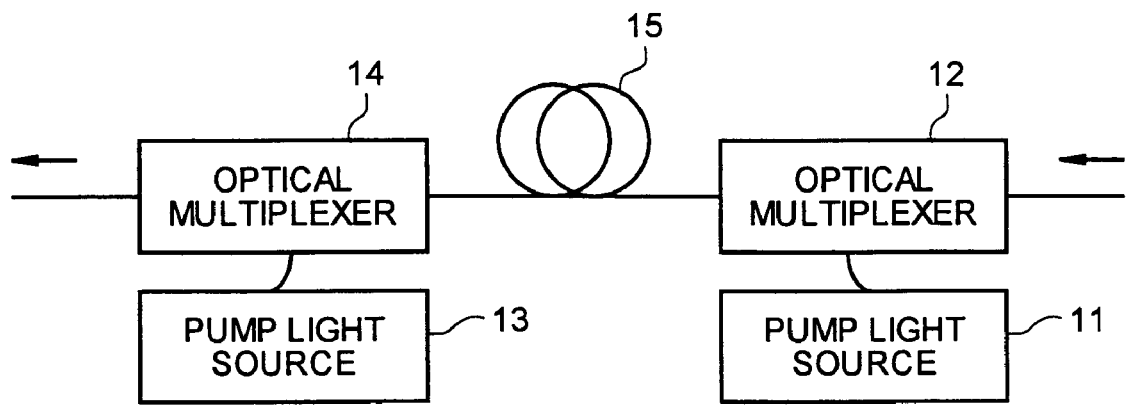
FIG. 1 is a block diagram of a distributed Raman amplifier of an embodiment according to the present invention.

Exemplary embodiments of an optical fiber, Raman amplifier, and optical communication line relating to the present invention will be explained in detail below with reference to the accompanying drawings.

Thus, an optical communication system using Raman amplification requires that the zero-dispersion wavelength of the optical fiber employed in a transmission line is smaller than the wavelength of the pump light. This does not mean that the larger dispersion in the wavelength band of the pump light is better for Raman amplification. It is preferable that the dispersion is not more than about 4 ps/nm/km. The reason is as follows. Normally, an optical fiber without a zero-dispersion wavelength in a range of 1430 to 1625 nanometers often has a zero-dispersion wavelength not longer than 1430 nanometers. A dispersion slope in a wavelength band of 1430 to 1625 nanometers is positive. Therefore, if the dispersion in the wavelength band of the pump light is not less than a certain degree of dispersion, e.g., 4 ps/nm/km, the dispersion in the signal wavelength band becomes too large and the waveform distortion of the signal light increases.

In addition, if an absolute value of the dispersion in the wavelength band of the pump light is set at not more than 4 ps/nm/km, it is possible to prevent the waveform distortion of the pump light caused by the dispersion and prevent a gain fluctuation. Further, there is proposed that a conventional single-mode optical fiber (hereinafter, "SMF") having a zero-dispersion wavelength in a wavelength band of 1.3 micrometers is employed in the transmission line. However, since this SMF has a relatively small relational value n2/Aeff, related to the magnitude of the Raman gain, a signal light cannot attain a Raman gain enough to compensate for the loss of the transmission line. In the relational value n2/Aeff, n2 is a Kerr coefficient and Aeff is an effective core area of the SMF.

To attain the sufficient Raman amplification gain, it is preferable to employ an optical fiber that has Raman gain efficiency equal to that of a conventional dispersion-shifted optical fiber (hereinafter, "DSF"), that is, not less than 0.75 (1/W/km).

The Aeff relates to a mode-field diameter (hereinafter, "MFD"), and therefore, it is necessary to set MFD small so as to make the Aeff small. Accordingly, in order to attain sufficiently high Raman gain efficiency, the MFD is preferably small, i.e., not more than 9 micrometers.

If the SMF is employed, a signal light in a wavelength band of 1.5 micrometers is subjected to dispersion as large as about +17 ps/nm/km. This dispersion causes pulse spreading and leads to nonlinear effect such as cross-phase modulation (hereinafter, "XPM"). Therefore, it is not preferable to employ the SMF.

It is obvious from the relational value n2/Aeff to make the Aeff small in order to attain the sufficient Raman amplification gain. However, to efficiently input the pump light into the transmission line, it is important to ensure good characteristics for fusion splicing with a SMF employed in an optical component such as a pig tail of a pump laser in an ordinary pump light source and an optical coupler.

A conventional SMF has an MFD of about 9.5 micrometers in a wavelength band of around 1430 nanometers. In addition, coupling efficiency between optical fibers having different MFD's can be estimated as given by the following Equation (1):

$$\eta = ((2 \times W1 \times W2)/(W1^2 + W2^2))^2 \quad (1)$$

where η is the coupling efficiency, and W1 and W2 are MFD's of the respective optical fibers.

If W1 is 9.5 micrometers and a signal light is caused to arrive at the transmission line with the coupling efficiency not less than 90%, the MFD needs to be not less than 7 micrometers.

Accordingly, the optical fiber requires the following characteristics to serve as the transmission line: 1) an MFD of not less than 7 micrometers in the wavelength band of the pump light; 2) a dispersion of not less than 0.1 ps/nm/km and not more than 4 ps/nm/km; and 3) a Raman gain efficiency of not less than 0.7 (1/W/km).

If a transmission line having a distance of 80 kilometers, which is typical of a long-distance transmission line, is used, the transmission loss of the optical fiber serving as the transmission line should be set to be not more than 0.25 dB/km to suppress the overall transmission loss within 20 decibels. The Raman amplification can cover slight transmission loss. However, considering the noise generation, it is preferable that the transmission loss over a signal wavelength band is suppressed to be not more than 0.25 dB/km.

Meanwhile, it is known that an optical fiber has an absorption loss caused by hydroxyl groups (hereinafter, "OH groups") at around 1390 nanometers. If the transmission loss of the optical fiber at 1390 nanometers exceeds 1 dB/km, a transmission loss at 1430 nanometers cannot be reduced due to the influence of a trailing of the absorption peak of OH groups, and thus a transmission loss in the pump light wavelength band increases. As a result, an expensive pump light source and a high electric power are required, which disadvantageously pushes up cost. If the transmission loss at 1390 nanometers increases by 10% by hydrogen generated in an optical fiber cable, a system-down disadvantageously occurs unless power of the pump light input to the transmission line increases.

It is known that polarization mode dispersion (hereinafter, "PMD") similarly hampers high-speed transmission. Namely, high-speed transmission without PMD compensation cannot be held if the PMD is not suppressed within 0.5 ps/km$^{1/2}$ similarly to an ordinary fiber cable. Besides, if a transmission rate is as high as 40 GB/s (gigabit/second), it is essential to set the PMD to be not more than 0.2 ps/km$^{1/2}$. Despite the requirement, it is more difficult to reduce the PMD as the structure of the optical fiber is more and more complex.

One example of the configuration of the optical fiber according to the present invention will next be explained.

Figure 3A:
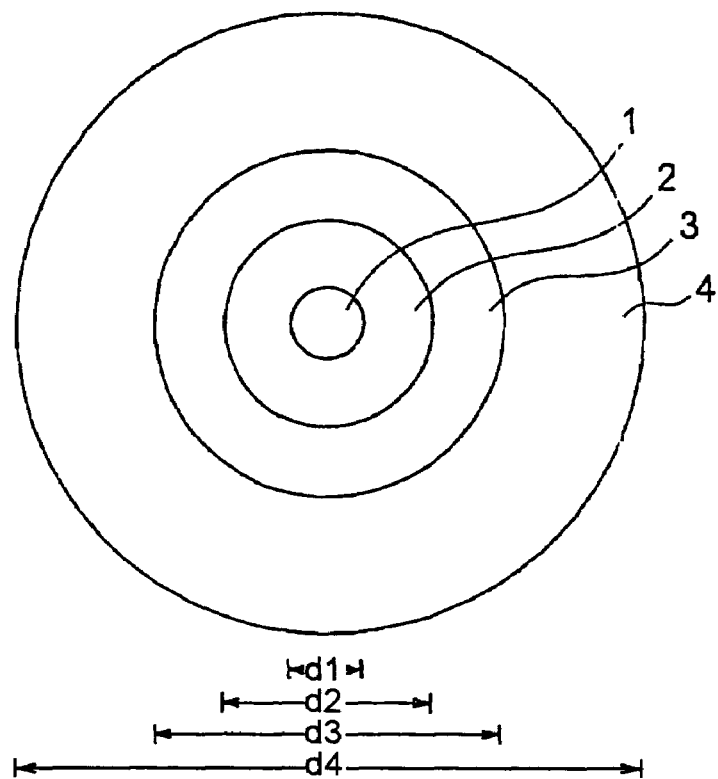
FIG. 3A illustrates an example of the configuration of an optical fiber employed in a transmission line shown in FIG. 2.
Figure 3B:
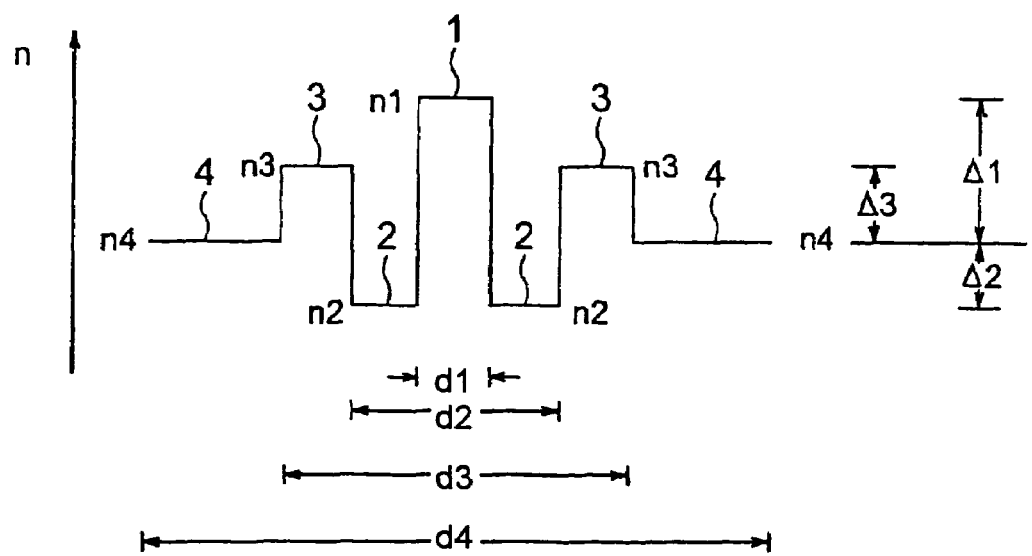
FIG. 3B illustrates an example of a refractive index profile of the optical fiber employed in the transmission line shown in FIG. 2.

The optical fiber illustrated in FIGS. 3A and 3B includes a first core 1, a second core 2, a third core 3, a cladding 4 and resin coatings, not shown, formed around the cladding 4. The first core 1 has a diameter of d1 and a refractive index of n1. The second core 2 is formed surrounding the first core 1 and has a diameter of d2 and a refractive index of n2. The third core 3 is formed surrounding the second core 2 and has a diameter of d3 and a refractive index of n3. The cladding 4 is formed surrounding the third core 3 and has a diameter of d4 and a refractive index of n4. The refractive index n1, n2, n3 and n4 have a magnitude relationship of n1>n3>n4>n2.

The cladding 4 is mainly made of silica. With the refractive index n4 of the cladding 4 set as a reference, a dopant that increases the refractive index, e.g., germanium is added to silica in each of the first core 1 and the third core 3 having the refractive index higher than n4. A dopant that decreases the refractive index, e.g., fluorine is added to silica in the second core 2 having the refractive index lower than n4.

Relative refractive index differences Δ1 to Δ3 are specified by the following Equations (2):

$$\Delta 1 = \frac{n1^2 - n4^2}{2n1^2} \cong \frac{n1 - n4}{n1} \quad (2)$$

-continued $$\Delta 2 = \frac{n2^2 - n4^2}{2n2^2} \cong \frac{n2 - n4}{n2}$$

$$\Delta 3 = \frac{n3^2 - n4^2}{2n3^2} \cong \frac{n3 - n4}{n3}$$

To form such an optical fiber, it is preferable to use an optical preform (optical fiber base material), of which the first core 1, the second core 2, the third core 3 and a part of the cladding 4 near the third core 3 are synthesized together. The optical fiber is obtained by drawing the optical preform. Thereafter, the optical fiber is disposed to an atmosphere containing deuterium ($D_2$). This deuterium ageing prevents the optical fiber from generating OH groups even if the optical fiber is exposed to hydrogen. Therefore, a loss increase around 1390 nanometers caused by OH groups can be decreased.

EXAMPLES

FIG. 4 is a table of parameters and characteristics of optical fibers manufactured by the above-mentioned method and constituted as illustrated in FIGS. 3A and 3B. As the optical fibers constituted as illustrated in FIGS. 3A and 3B, six types of optical fibers are manufactured each with varied relative refractive index differences Δ1 to Δ3 and varied diameters d1, d2, and d3 (micrometers).

It is assumed herein that the diameters d1, d2, and d3 are defined as follows. The diameter d1 is a diameter of the first core 1 at a position at which the first core 1 is equal in refractive index to the cladding 4. The diameter d2 is a diameter of the second core 2 at a position on a boundary between the second core 2 and the third core 3 and at which the second core 2 has a refractive index of a half of Δ2. The diameter d3 is a diameter of the third core 3 on a boundary between the third core 3 and the cladding 4 and at which the third core 3 has a refractive index of a one-tenth of Δ3.

Specifically, FIG. 4 illustrates, for each of the six types of optical fibers, a zero-dispersion wavelength $\lambda_0$ (nanometers), a dispersion D (ps/nm/km) at a wavelength of 1450 nanometers, a transmission loss LOSS (dB/km) at the wavelength of 1450 nanometers, the MFD at the wavelength of 1450 nanometers, Raman gain efficiency gR/Aeff at the wavelength of 1450 nanometers, a bending loss $LOSS_{\phi 20}$ (dB/m) in the diameter of 20 millimeters (φ20) at a wavelength of 1550 nanometers, and a cutoff wavelength λcc.

The cutoff wavelength λcc indicates a cable-cutoff wavelength λcc defined by International Telecommunications Union, Telecommunication Standardization Sector (hereinafter, "ITU-T") G.650. The other terms, unless particularly defined in this specification conform to definitions and measurement methods specified in the ITU-T G.650.

A signal wavelength most frequently used in WDM transmission is 1550 nanometers. Therefore, the characteristics of the respective optical fibers at the wavelength of 1450 nanometers, that is, the wavelength of the pump light, for the signal wavelength of 1550 nanometers are shown as the characteristics thereof in the wavelength band of the pump light.

At the signal wavelength of 1550 nanometers, if the bending loss of the optical fiber is not more than 5 dB/m in the diameter of 20 millimeters, it is known that the optical fiber can be used even in L-band. These prototype optical fibers satisfy this condition and can be applied to optical fiber cables capable of transmission up to L-band. In other words, all the optical fibers shown in FIG. 4 can be applied to optical fiber cables capable of transmission in both of C-band and L-band.

FIG. 4 also demonstrates that all the optical fibers in the examples have MFD's of not less than 7 micrometers and not more than 9 micrometers, good coupling efficiency with the SMF, and that the pump light for subjecting the signal light to Raman amplification can be efficiently used.

All the optical fibers in the examples have cable-cutoff wavelengths λcc of not longer than 1430 nanometers, thus ensuring a single-mode propagation in a wavelength range of not shorter than 1430 nanometers.

The dispersion D of each optical fiber falls within a range of 0.1 to 4 ps/nm/km, thus enabling stable amplification without causing the waveform distortion of the pump light due to wavelength dispersion.

Figure 5:
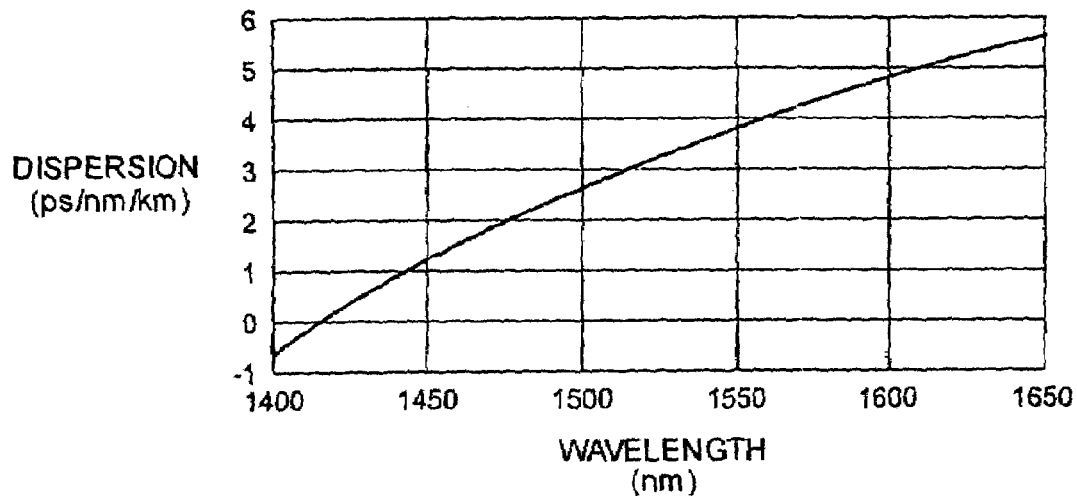
FIG. 5 is a graph that illustrates an example of wavelength characteristics of dispersion of the first optical fibers illustrated in FIG. 4.

FIG. 5 is a graph that illustrates wavelength characteristics of dispersion of the first (#1) optical fibers shown in FIG. 4. In the graph of FIG. 5, the horizontal axis indicates wavelength and the vertical axis indicates dispersion.

The PMD of each optical fiber is not more than 0.1 $ps/km^{1/2}$ and no waveform distortion caused by the PMD is seen.

An effective length Leff of each optical fiber is given by the following Equation (3):

$$Leff=(1-\exp(-\alpha*L))/\alpha \tag{3}$$

where α is a loss of the optical fiber and L is a length of the optical fiber.

In order to efficiently use the pump light in the transmission line having a transmission distance of 60 kilometers, the effective length of the optical fiber is preferably 15 kilometers or more. The loss α that satisfies this condition corresponds to not more than 0.285 dB/km.

All the optical fibers shown in FIG. 4 have transmission losses not more than 0.285 dB/km, thus each realizing an intended transmission loss.

Further, the first, fifth and sixth (#1, 5 and 6) optical fibers realize transmission losses of 0.25 dB/km and have effective lengths Leff of not less than 17 kilometers. Therefore, each of these optical fibers can be used as more efficient transmission mediums.

In C-band transmission and L-band transmission, the transmission loss at around 1390 nanometers caused by mixing of OH groups is almost negligible. However, because of the trailing edge of the spectrum loss, if the transmission loss increases at around 1390 nanometers, the transmission loss at 1450 nanometers also increases. Although the transmission loss at around 1450 nanometers is mainly derived from Rayleigh scattering, an inappropriate structure of the optical fiber, etc., this causes a loss increase of about 3% of a loss peak at 1390 nanometers.

The transmission loss in a state in which there is no increase in transmission loss due to the OH groups is almost about 0.247 dB/km. Therefore, if the loss peak at 1390 nanometers increases by about 0.1 dB/km, the transmission loss at 1450 nanometers exceeds 0.25 dB/km.

Even if there is no increase in transmission loss due to the OH groups, the transmission loss at around 1390 nanometers is 0.28 dB/km. The transmission loss increase up to 0.4 dB/km is a maximum increase with which the transmission loss at 1450 nanometers can be suppressed down to 0.25 dB/km. Therefore, the transmission loss at 1390 nanometers needs to be suppressed to 0.4 dB/km.

Figure 6:
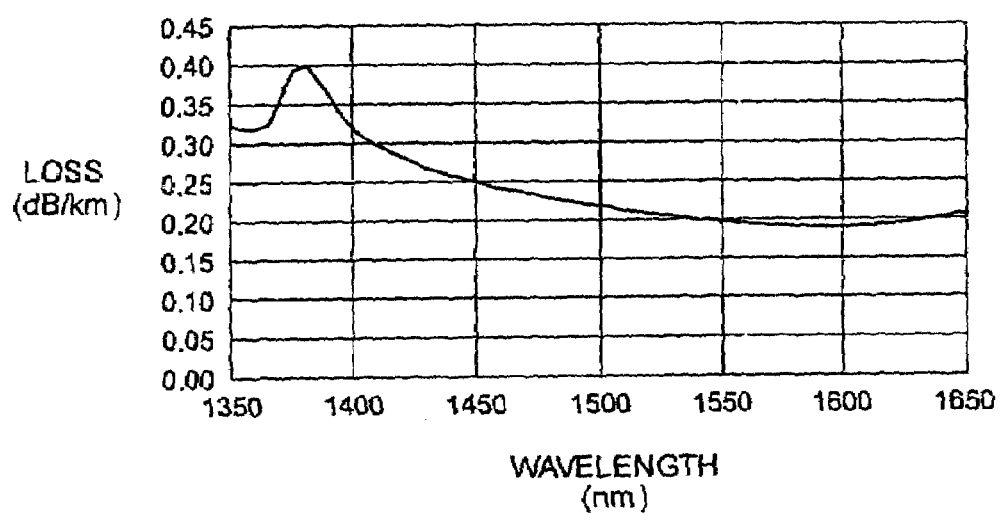
FIG. 6 is a graph that illustrates an example of a relationship between the wavelength and the transmission loss of the first optical fibers shown in FIG. 4.

FIG. 6 is a graph that illustrates wavelength loss characteristics of the #1 optical fiber. In the graph of FIG. 6, the horizontal axis indicates wavelength and the vertical axis indicates transmission loss.

It is necessary to suppress an increase in the transmission loss derived from the generation of hydrogen in the optical fiber cable. For this reason, all of first to sixth (#1 to 6) types of optical fibers are drawn from preforms (optical fiber base materials), coated with resin, and exposed to $D_2$-containing $N_2$ atmosphere at room temperature and atmospheric pressure for 24 hours before being formed into optical fiber cables, respectively.

Each prototype optical fiber is subjected next to a hydrogen-ageing test. The following conditions for the hydrogen-ageing test are in compliance with IEC60793-2 Amendment 1, 2001-8 Annex C.

Each optical fiber is exposed to an atmosphere containing hydrogen of 0.01 atm at room temperature. The exposed state is kept until the transmission loss at a wavelength of 1240 nanometers increases by not less than 0.03 dB/km from the transmission loss before the hydrogen exposure (the initial transmission loss). Thereafter, the optical fiber is taken out into air, left as it is for 14 days or more, and the transmission loss is measured.

The transmission loss is measured at a wavelength of 1390 nanometers. Since the optical fiber according to the present invention is subjected to deuterium ageing, the transmission loss at 1390 nanometers is hardly increased by the hydrogen-ageing test.

FIG. 1 is a block diagram of a distributed Raman amplifier using the optical fiber according to the first embodiment of the present invention.

The distributed Raman amplifier 10 illustrated in FIG. 1 consists of the first and the second pump light sources 11 and 13, the optical multiplexers 12 and 14, and the optical fiber 15.

In this embodiment, with a view of making a longitudinal light intensity distribution of the optical fiber 15 more uniform, the pump light for Raman amplification is incident in the optical fiber 15 from both the first pump light source 11 provided in front of the optical fiber 15 (in a direction equal to an input direction of the signal light) and the second pump light source 13 provided in rear of the optical fiber 15 (in a direction in which the signal light is output). Namely, this system performs bidirectional pumping.

It is preferable that the system using the Raman amplification performs this bidirectional pumping so as to make the longitudinal light intensity distribution of the optical fiber more uniform.

Figure 2:
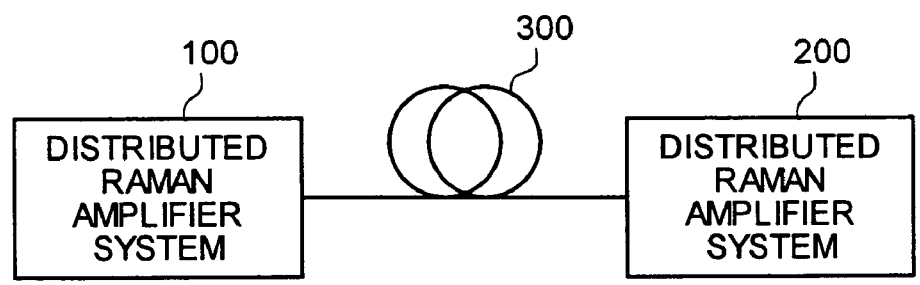
FIG. 2 is a block diagram of an optical communication system using the distributed Raman amplifier illustrated in FIG. 1.

FIG. 2 is a block diagram illustrating that the distributed Raman amplifier 10 illustrated in FIG. 1 is applied to an optical communication system.

The optical communication system illustrated in FIG. 2 is constituted so that distributed Raman amplifiers 100 and 200 equal in configuration to the Raman amplifier 10 illustrated in FIG. 1 are arranged on a reception end and a transmission end, respectively, and that an optical fiber (a transmission line) 300 couples the distributed Raman amplifiers 100 and 200. The optical fiber 15 included in the distributed Raman amplifiers 100 and 200 are equal to the optical fiber 300.

The optical transmission system illustrated in FIG. 2 is actually constituted by using the first (#1) optical fiber having a transmission distance of 100 kilometers. The transmission loss of the first optical fiber is 0.20 dB/km at 1550 nanometers, and the loss of the transmission line (optical fiber 300) itself shown in FIG. 2 is 20 decibels. The actual transmission line has a transmission loss of 28 decibels since a coupling loss and losses of the optical components are added to the transmission loss. The Raman gain efficiency of each optical fiber is 0.79 (1/W/km). Even if a pump light at 0.3 watt is used, an incident power of the pump light when the light is incident on the optical fiber is 0.27 watt and the system attains a gain of 14 decibels. As a result, only the inexpensive EDFA using the Er-doped optical fiber and having a transmission loss of not more than 15 decibels enables loss compensation.

In the embodiment of the present invention, it suffices that the optical fiber has the configuration and the refractive index profile satisfying the conditions explained above, and the optical fiber is not limited to that constituted as illustrated in FIGS. 3A and 3B.

The present invention can improve the characteristics of the distributed Raman amplifier in C-band and L-band, and realize effective amplification at a low pump power.

Further, the present invention can provide the optical communication system capable of decreasing the deterioration of the transmission characteristics caused by the FWM that occurs in the signal light and the pump light wavelength bands.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber that has
    a cable-cutoff wavelength of not longer than 1430 nanometers,
    a mode-field diameter of not less than 7 micrometers and not more than 9 micrometers at a wavelength of 1450 nanometers,
    a transmission loss of not more than 0.285 dB/km at the wavelength of 1450 nanometers,
    a dispersion of not less than 0.1 ps/nm/km and not more than 4 ps/nm/km at the wavelength of 1450 nanometers, and
    a zero-dispersion wavelength of not more than 1430 nanometers.

2. The optical fiber according to claim 1, wherein the transmission loss is not more than 0.25 dB/km at the wavelength of 1450 nanometers.

3. The optical fiber according to claim 1, having a bending loss of not more than 5 dB/m, in a curvature diameter of 20 millimeters at bending, at a wavelength of 1550 nanometers.

4. The optical fiber according to claim 1 having a Raman gain efficiency of not less than 0.7 (1/W/km) at the wavelength of 1450 nanometers.

5. The optical fiber according to claim 1, having a transmission loss of not more than 0.4 dB/km at a wavelength of 1390 nanometers after hydrogen ageing.

6. The optical fiber according to claim 1, further comprising:
    a cladding;
    a first core at a center of the optical fiber;
    a second core surrounding the first core, and having a lower refractive index than the cladding; and
    a third core surrounding the second core, and having a lower refractive index than the first core and higher refractive index than the cladding.

7. The optical fiber according to claim 1, subjected to deuterium ageing.

8. A distributed Raman amplifier comprising:
    an optical fiber that has a cable-cutoff wavelength of not longer than 1430 nanometers, a mode-field diameter of not less than 7 micrometers and not more than 9 micrometers at a wavelength of 1450 nanometers, a transmission loss of not more than 0.285 dB/km at the wavelength of 1450 nanometers, a dispersion of not less than 0.1 ps/nm/km and not more than 4 ps/nm/km at the wavelength of 1450 nanometers, and a zero-dispersion wavelength of not more than 1430 nanometers.

9. An optical communication system comprising:

a first optical fiber serving as a transmission line, wherein the optical fiber has a cable-cutoff wavelength of not longer than 1430 nanometers, a mode-field diameter of not less than 7 micrometers and not more than 9 micrometers at a wavelength of 1450 nanometers, a transmission loss of not more than 0.285 dB/km at the wavelength of 1450 nanometers, a dispersion of not less than 0.1 ps/nm/km and not more than 4 ps/nm/km at the wavelength of 1450 nanometers, and a zero-dispersion wavelength of not more than 1430 nanometers; and a distributed Raman amplifier that includes a second optical fiber serving as an amplifying medium, wherein the second optical fiber has the same characteristics as the first optical fiber.

* * * * *